Patented July 22, 1941

2,250,040

UNITED STATES PATENT OFFICE 2,250,040

NONGELLING ZEIN SOLUTION

Oswald C. H. Sturken, Closter, N. J., assignor to Corn Products Refining Company, New York, N. Y., a corporation of New Jersey No Drawing. Application December 15, 1938, Serial No. 245,921

6 Claims. (Cl. 106—153)

This invention relates to zein solutions and has for its object to produce a solution of zein, for use as a coating or impregnating agent, or as an adhesive or for other purposes, which will remain stable, that is, will stand without gelling or denaturing for long periods of time. The ordinary alcoholic solutions of zein, for example, a solution of zein in 95% ethyl alcohol, will begin to gell after standing for ten days, more or less. The zein solution of the present invention will remain stable for six months or more.

The invention is based on the discovery that a solution of dry zein and anhydrous ethyl alcohol, pure or denatured, made by first dissolving the zein in an anhydrous solvent of dry zein, compatible with ethyl alcohol (since zein is not soluble directly in absolute ethyl alcohol) will stand without gelling for a very much longer period of time than ordinary zein solutions, and hence will be of considerable commercial value, since stable solutions need not be used immediately but may be kept on hand and used from time to time when needed.

In order to have the full advantage of the invention, namely, stability for long periods of time, it is necessary that the solution be substantially water-free. The presence of water in a zein solution is one of the principal factors bringing about the gelling or denaturation of the zein.

It is essential, therefore, that the zein be dry in the absolute sense or substantially so. Zein ordinarily contains moisture to the extent of 6% to 8% by weight or more. This natural moisture in the commercial zein must be removed.

The solvents used for dissolving the dry zein may be called primary solvents. They must be capable of dissolving the zein in its dry state (which is not the case with ethyl alcohol, which requires the presence of water in order that it may dissolve the zein); they must contain, in themselves, no substantial quantity of water; and they must be compatible with absolute ethyl alcohol. The following are suitable primary solvents: dibutyl tartrate, diethylene glycol, and triethylene glycol. These substances are not objectionable in the solution, but on the contrary have a plasticizing effect which in most cases is desirable. They are all characterized by containing hydroxyl groups in their molecular structure.

The secondary solvent, ethyl alcohol, the solvent effect of which is contingent on the presence of the primary solvent, must also be substantially free from water.

The zein itself must be dried so as to contain substantially no water.

The following is a specific example of the reduction of the invention to practice. It will be understood that this example is merely typical and informative. The invention is not limited to the particular ingredients or their proportions except as specifically so limited in the claims appended hereto.

*Example*

100 parts by weight of zein, dried so as to remove substantially all moisture, is mixed with 44 parts of dibutyl tartrate and 237 parts of anhydrous ethyl alcohol.

The proportion of dibutyl tartrate may vary from 44 to 66 parts by weight. The proportion of anhydrous ethyl alcohol may vary from 79 to 316 parts by weight.

Other primary solvents have been indicated above and may be used in substitution for dibutyl tartrate within the limits just indicated.

I claim:

1. Process for the production of a stable zein solution which comprises: drying the zein to a substantially anhydrous state; and dissolving the dried zein in anhydrous ethyl alcohol and an anhydrous solvent of dry zein compatible with anhydrous ethyl alcohol selected from the group of substances, all characterized by containing a hydroxyl group in their molecular structures, consisting of dibutyl tartrate, diethylene glycol, and triethylene glycol; whereby the solution is substantially water free and capable of standing for long periods of time without gelling.

2. Process for the production of a stable zein solution which comprises: drying zein to a substantially anhydrous state; dissolving the dried zein in anhydrous ethyl alcohol and anhydrous dibutyl tartrate, whereby the solution is substantially water free and capable of standing for long periods of time without gelling.

3. Process for the production of a stable zein solution which comprises: drying the zein to a substantially anhydrous state; and dissolving 100 parts, by weight, of the dried zein in 79–316 parts of anhydrous ethyl alcohol and 44–66 parts of anhydrous dibutyl tartrate, whereby the solution is substantially water free and capable of standing for long periods of time without gelling.

4. A stable zein solution which contains: zein; ethyl alcohol; and a solvent of dry zein compatible with ethyl alcohol selected from the group of substances, all characterized by containing hydroxyl groups in their molecular structures, consisting of dibutyl tartrate, diethylene glycol, and triethylene glycol: all of the ingredients of said solution being substantially anhydrous whereby the solution is capable of standing for a long period of time without gelling.

5. A stable zein solution which contains: zein; ethyl alcohol; and dibutyl tartrate: all of the ingredients of said solution being substantially anhydrous, whereby the solution is capable of standing for a long period of time without gelling.

6. A stable zein solution which contains the following substances in proportions, by weight, substantially as follows: zein 100 parts, ethyl alcohol 79 to 316 parts, and dibutyl tartrate 44 to 66 parts: all of the ingredients of said solution being substantially anhydrous, whereby the solution is capable of standing for a long period of time without gelling.

OSWALD C. H. STURKEN.